UNITED STATES PATENT OFFICE.

WILLIAM KOEHLER, OF CLEVELAND, OHIO.

METHOD OF SECURING THE CHLORIDIZATION OF ORES.

942,569. Specification of Letters Patent. Patented Dec. 7, 1909.

No Drawing. Application filed March 26, 1909. Serial No. 485,899.

*To all whom it may concern:*

Be it known that I, WILLIAM KOEHLER, a citizen of the United States of America, residing at Cleveland, in the county of Cuyahoga and State of Ohio, have invented certain new and useful Improvements in Methods of Securing the Chloridization of Ores; and I do hereby declare the following to be a full, clear, and exact description of the invention, such as will enable others skilled in the art to which it pertains to make and use the same.

This invention relates to a new process for the treatment of refractory or rebellious ores in order to bring them into such a condition that they may be easily worked according to well known methods.

The object of this invention is to provide a cheap and economical method of securing the complete chloridization of ores.

My invention therefore consists in subjecting the material or ore at a suitable temperature, which will vary according to the ore under treatment, to the action of a halogen acid in the presence of hydrogen.

In carrying out my process I prefer to subject the material or ore, which is to be treated, to the action of hydrochloric acid in the presence of hydrogen.

To secure the proper working of my process the ore should be at a suitable temperature during the working, and this temperature will vary according to the nature of the treatment, but must be below the temperature necessary for the vaporization of the metallic chlorids formed. In some instances the heat of combination will be sufficient alone to bring about the decomposition of the material and in other instances the heat of combination will not be sufficient to carry out the reaction, but it will be necessary therefore to apply external heat.

The process can be carried out in any suitable metallurgical furnace, decomposition receptacle or similar apparatus.

In carrying out my process the material or ore to be treated is first reduced to the proper size and is then placed in the receiving chamber of the furnace or decomposition receptacle, preferably a tube mill. The hydrochloric acid is allowed to enter the chamber together with the hydrogen and the furnace is maintained at a temperature suitable to effect the decomposition of the ore and the formation of chlorids of the metallic constituents, but not high enough to vaporize the metallic chlorids formed, but high enough to secure the liberation of the metalloids either in their elemental condition or as volatile compounds.

For commercial purposes very good results are obtained by using a halogen acid gas, preferably hydrochloric acid together with water gas in which case we have the halogen acid acting in the presence of hydrogen and a carbon compound.

What I claim is,—

1. The process of treating refractory ores which consists in subjecting them to the action of a halogen acid in the presence of hydrogen.

2. The process of treating refractory ores consisting in subjecting them to the action of a halogen acid in the presence of hydrogen and a carbon compound.

3. The process of treating refractory ores which consists in subjecting them to the action of hydrochloric acid in the presence of hydrogen.

4. The process of treating refractory ores which consists in subjecting them to the action of hydrochloric acid in the presence of a carbon compound and hydrogen.

5. The process of treating refractory ores which consists in subjecting them to the action of a halogen acid gas in the presence of hydrogen.

6. The process of treating refractory ores which consists in subjecting them to the action of a halogen acid gas in the presence of hydrogen and a carbon compound.

7. The process of treating refractory ores which consists in subjecting them to the action of gaseous hydrochloric acid in the presence of hydrogen.

8. The process of treating refractory ores which consists in subjecting them to the action of gaseous hydrochloric acid in the presence of hydrogen and a carbon compound.

In testimony whereof, I sign the foregoing specification, in the presence of two witnesses.

WILLIAM KOEHLER.

Witnesses:
VICTOR C. LYNCH,
H. McDONNELL.